Patented June 24, 1930

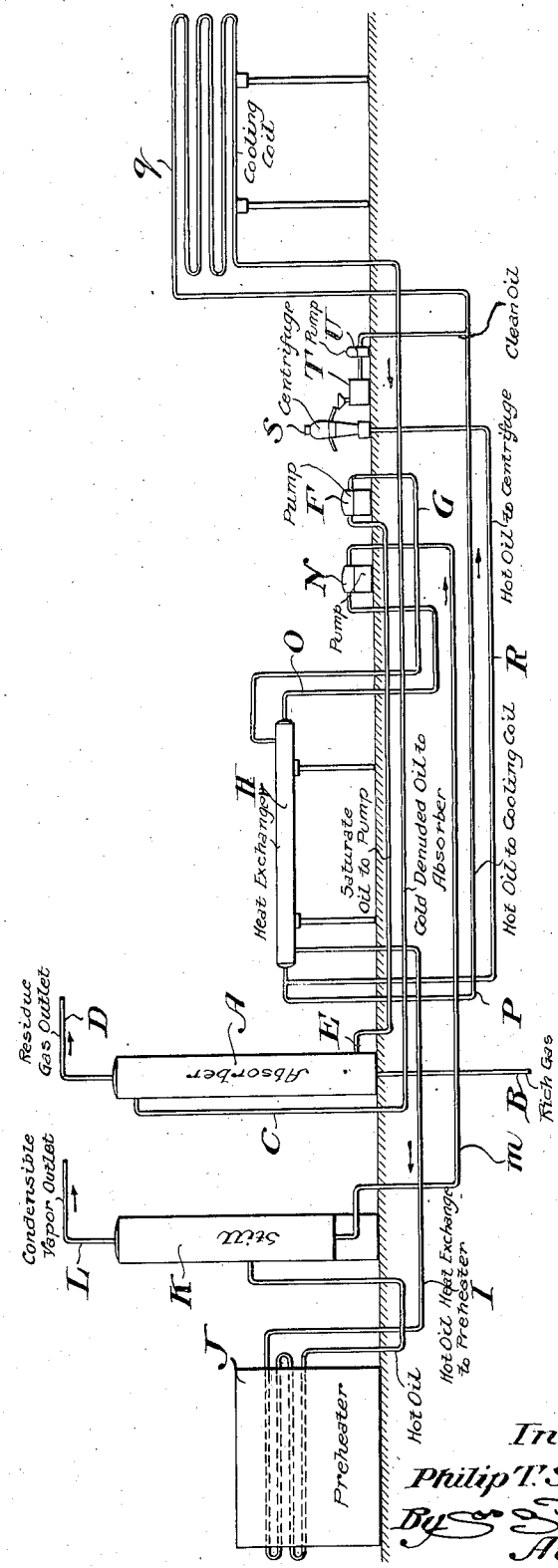

1,766,195

UNITED STATES PATENT OFFICE

PHILIP TRIEST SHARPLES, OF MERION, PENNSYLVANIA, ASSIGNOR TO THE SHARPLES SPECIALTY COMPANY, OF PHILADELPHIA, PENNSYLVANIA, A CORPORATION OF DELAWARE

ABSORPTION PROCESS

Application filed April 4, 1925. Serial No. 20,758.

This invention is an improved process for effecting the segregation of gasoline vapors from natural gas by means of a liquid menstruum making intimate contact with the gas and having a high absorption efficiency resulting from the removal from the circulating menstruum of contaminating particles held in suspension therein and which cannot be removed by settling. By subjecting the menstruum, preferably after saturation and stripping, to high centrifugal force, there is effected the removal therefrom of moisture held in colloidal suspension and also of finely divided solids, such as particles of suspended carbon, dust, sand, clay, pipe scale, metal and inorganic salts which accumulate in the operation of a plant and which enmesh in the menstruum further moisture and impede the mechanical operations of the plant.

The presence of moisture in oily menstruum has a distinct retarding effect upon the absorption from gas of vapors soluble in the menstruum, which may be due to changes in surface tension or to change in the degree of solubility. By the removal from the menstruum of such moisture and other contaminating particles, not only is the absorption efficiency markedly increased, but the mechanical operation of the plant is greatly simplified and improved, since absorption towers need not be cleaned of sludge accumulations; stills need not be freed of carbon accumulations; circulation will not be interrupted by sedimentation at low points or traps in the system; danger of freezing of wet sludge accumulations is avoided; excess and disadvantageous moisture in tail gas is prevented; and the gasoline produced is of good color owing to the elimination of finely divided sludge or carbon particles which, when present, act catalytically to produce polymerizable hydrocarbons in distillation and are carried over in part with the gasoline vapor from the still to color the condensed gasoline.

In the practice of my invention, cooled absorption menstruum, such as mineral seal oil, is pumped in a cyclic operation through an absorption tower, where it comes into intimate contact with natural gas under pressure flowing counter-current thereto. The oil absorbs from the gas, gasoline hydrocarbons and lower boiling point hydrocarbons; and the gasoline vapors are stripped from the oil by distillation with saturated or superheated steam, or recirculated hydrocarbon vapor, which is never completely dry. The stripped menstruum is preferably passed through a heat exchanger and cooling coils before being returned to the absorption tower. As a result of the circulation and distillation, the oil becomes contaminated with moisture and minutely divided solid particles, and such contaminated oil is subjected at a convenient point in the cycle to high centrifugal force, preferably by passage through a rapidly rotating tubular bowl having an imperforate wall and small diameter relatively to its axial length. While it is desirable to pass the entire body of oil through the centrifuge during each cycle, this is often impracticable, and effective results may be accomplished by by-passing a portion of the total circulating oil through the centrifuge in each passage of the oil through the plant. A convenient and satisfactory point for the withdrawal of the oil for centrifuging is where the stripped oil leaves the heat exchanger before going to the cooling coils, since the lower viscosity of the oil at a somewhat elevated temperature facilitates the separation of the moisture and detritus to be removed, and at the same time the temperature is low enough so that moisture and sludge are precipitated in proper physical condition for effective removal. The specific design of the plant in which my process is installed may, however, render desirable the withdrawal of the oil at a different point and lower temperature such as at the end of the cooling coils before the oil returns to the absorption tower, which location is superior for plants operating under saturated steam conditions.

My copending application Serial No. 44,907, filed July 20th, 1925, is directed to the solution of a problem having features in common with this invention; and in that application the claims are not limited to the dividing of the stream of absorption menstruum and the centrifugal treatment of one branch of that stream.

By my improved process the color of a distillate is improved by extracting by centrifugal force from the substance from which the distillate is evolved colloidal particles which if allowed to remain produce polymerizable products in distillation.

The accompanying drawing illustrates diagrammatically a plan for the practice of my invention and shows an absorber A supplied with gasoline-saturated gas from the pipe line B and with absorber oil from the pipe C. Unabsorbed constituents of the gas escape from the absorber through the outlet D and the gasoline saturated oil is drawn through the pipe E by the pump F and pumped through the pipe G to the heat exchanger H. The warmed oil passes through the pipe I to the preheater J from whence it flows to the still K from which the vapor is drawn off through the condensable vapor outlet L. The hot stripped oil passes from the still through the pipe M to the pump N by which it is pumped through the pipe O to the heat exchanger H, where it gives up a part of its heat. The hot oil flowing from the heat exchanger H is divided, a portion of it passing directly through the pipe P to the cooling coils Q and the remainder passing at a temperature of approximately 220° F. through the pipe R to the inlet of the centrifuge S by which the impurities are extracted. The cleaned oil from the centrifuge flows into a reservoir T from which it is pumped by a pump U into the pipe line P where it joins with the remaining oil flowing to the cooling coils Q. The cooled oil passing from the cooling coils flows through the pipe C to the top of the absorber A.

Having described my invention, I claim:

1. The process which comprises extracting gasoline vapors from natural gas by contact with an absorbent liquid, stripping the gasoline vapors from the liquid by distillation, subjecting a portion of the stripped liquid to high centrifugal force, and absorbing further gasoline vapors in the combined centrifuged and uncentrifuged liquid in a cyclic operation.

2. The process of removing gasoline from natural gas which comprises establishing an endless circulation of absorption oil and, in the course of its circulation, successively absorbing therein gasoline from natural gas and distilling the absorbed gasoline therefrom, dividing the flowing stream of oil along a limited part of its course into a plurality of paths, and applying centrifugal force to the oil along one of said paths to separate therefrom contaminating material of higher specific gravity than the oil.

3. The process of removing gasoline from natural gas which comprises establishing an endless circulation of absorption oil and, in the course of its circulation, successively absorbing therein gasoline from natural gas and distilling the absorbed gasoline therefrom, by-passing in its flow from the locus of distillation to the locus of absorption, a part of the oil thus freed of gasoline, centrifugally purifying the oil so by-passed, and conveying the purified oil to the locus of absorption.

4. The process which comprises absorbing a constituent of a gas in and stripping it from a liquid mentruum in a cylclic operation, subjecting a portion of the stripped liquid to high centrifugal force to separate therefrom contaminating material of higher specific gravity than the menstruum, and absorbing further quantities of said constituent in the combined centrifuged and uncentrifuged menstruum in the cyclic operation.

5. The process of recovering a constituent of a gas which comprises establishing an endless circulation of absorption oil and in the course of its circulation successively absorbing therein said constituent and distilling the absorbed constituent therefrom, dividing the flowing stream of oil along a limited part of its course into a plurality of paths, and applying centrifugal force to the oil along one of said paths to separate therefrom contaminating material of higher specific gravity than the oil.

6. The process of recovering a constituent of a gas which comprises establishing an endless circulation of absorption oil and in the course of its circulation successively absorbing therein said constituent and distilling the absorbed constituents therefrom, dividing the stream of oil flowing from said distilling step to said absorption step into a plurality of paths, and applying centrifugal force to the oil along one of said paths to separate therefrom contaminating material of higher specific gravity than the oil.

7. The process which comprises the absorption of a condensable hydrocarbon in a menstruum, stripping the hydrocarbon from the menstruum by distillation, centrifuging a portion of the stripped menstruum while hot, mixing centrifuged and uncentrifuged portions of the menstruum, and absorbing further condensable hydrocarbon in the mixed portions of the menstruum.

In witness whereof, I have hereunto set my name this 2nd day of April, 1925.

PHILIP TRIEST SHARPLES.